United States Patent [19]
Dziuba et al.

[11] 3,735,573
[45] May 29, 1973

[54] AGRICULTURAL MACHINE

[75] Inventors: Peter Dziuba, Im Oschle; Josef Gebele, Saulgau, both of Germany

[73] Assignee: Josef Bautz GmbH, Saulgau/Wurtt., Germany

[22] Filed: May 12, 1971

[21] Appl. No.: 142,561

[30] Foreign Application Priority Data

May 13, 1970 Germany.....................P 20 23 248.8

[52] U.S. Cl. ................................................56/370
[51] Int. Cl. .............................................A01d 79/00
[58] Field of Search...............................56/370, 377

[56] References Cited

UNITED STATES PATENTS

| 3,511,040 | 5/1970 | Purrer et al. | 56/370 |
| 3,555,800 | 1/1971 | Stoll et al. | 56/370 |

FOREIGN PATENTS OR APPLICATIONS

| 2,024,167 | 11/1970 | Germany | 56/370 |
| 1,929,104 | 12/1970 | Germany | 56/370 |

Primary Examiner—Louis G. Mancene
Assistant Examiner—J. N. Eskovitz
Attorney—Michael S. Striker

[57] ABSTRACT

A hub is carried by a support turnable about an upright axis and in turn provides a plurality of arms which radiate from it and carry at their respective outer end portions sets of parallel tines which project downwardly toward the ground. The tines are so mounted that each set turns about a vertical and a horizontal axis and when the arms turn with their hub, each set extends during one portion of the circular path in which it moves, substantially tangential to this path and in this portion has a vertical component of movement relative to the path about the respective horizontal axis.

8 Claims, 3 Drawing Figures

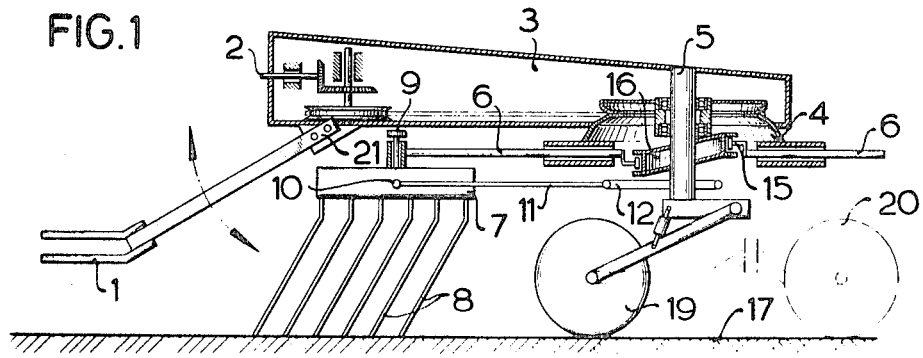
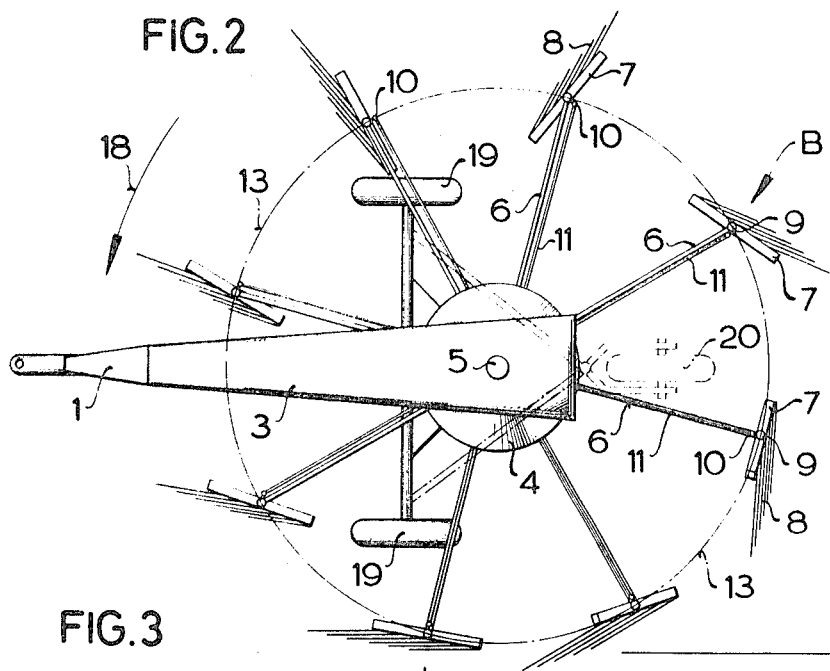
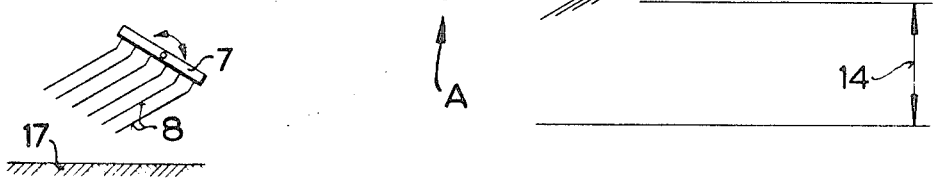
INVENTOR
PETER DZIUBA
JOSEF GEßELE

AGRICULTURAL MACHINE

BACKGROUND OF THE INVENTION

The present invention relates generally to an agricultural machine, and more particularly to a machine for turning and moving hay and similar commodities.

Such machines are already known. Essentially they utilize a circularly movable rake composed of a hub providing with arms radiating from it and the hub being movable about an upright axis. The free ends of the arms are provided with downwardly projecting tines, and the construction is such that during a portion of the circular path performed by each arm, the tines on the respective supporting arm thereof are caused to move in contact with the ground and during the remainder of the portion of the circular path they move out of contact with the ground. During the movement with the ground the tines engage a commodity, that is usually hay, which is pushed ahead of the tines and which it is intended to deposit laterally of the direction of the movement of the agricultural machine in form of a stack. To do this the controls provided for this purpose in the apparatus turn the supporting arm carrying the tines about its longitudinal axis or lift it and move the tines in forward direction of movement of the machine—inclined to the ground—out of the hay and over the stack which is deposited laterally of the machine. Thus, the machine clears a path-shaped section of the field and deposits the cleared hay laterally of the section in a row of stacks, with the term stack being intended to broadly designate any accumulation of hay irrespective of the particular configuration.

The prior art machines of this type have the disadvantage that the radial positioning of the tines causes the hay to be thrown radially outwardly due to centrifugal force and to become deposited too far away from the machine, with the result that the stack thus formed is ill defined. An alternate problem, or a problem which sometimes occurs simultaneously with the first-mentioned one, is that the hay does not separate properly from the tines so that the raking action afforded by the machine is not fully satisfactory.

SUMMARY OF THE INVENTION

It is, accordingly, an object of the present invention to overcome the aforementioned disadvantages of the prior art.

More particularly it is an object of the present invention to provide an improved agricultural machine of the type under discussion which is not possessed of these disadvantages.

Still more particularly it is an object of the invention to provide such an agricultural machine in which the raking action afforded is complete and clean, and in which the material properly separates from the tines and is stacked laterally of the path of movement of the machine in well-defined manner.

In pursuance of the above objects, and of others which will become apparent hereafter, one feature of the invention resides in an agricultural machine which, briefly stated, comprises support means spaced upwardly from the ground on which the machine is supported. A hub is carried by the support means turnable about an upright axis. A plurality of arms is carried by and extends upwardly from the hub and each arm has an outer free end portion. A plurality of sets each composed of parallel tines is carried on the respective end portions, projecting downwardly toward the ground. The sets of tines are each mounted for turning movement about a vertical and a horizontal axis and turn with the arms in a circular path during one portion of which each set extends at least substantially tangential to the path and has a vertical component of movement relative to the path about the respective horizontal axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a fragmentary partially sectioned side-elevational view illustrating a machine according to the present invention.

FIG. 2 is a top-plan view of FIG. 1; and

FIG. 3 is a diagrammatic side view of one set of tines in a particular position thereof.

DESCRIPTION OF THE PREFERRED EMBODIMENTS

Discussing now the drawing in detail it will be seen that in FIG. 1 there is illustrated an agricultural machine of the type under discussion which is provided with a guide pole 1 by means of which the machine may be secured to a tractor or the like (not shown) for movement in a predetermined direction. Reference numeral 3 identifies a housing accommodating a gear drive whose input shaft is identified with reference numeral 2 and can be connected with a source of motive power (not illustrated). Mounted in the housing 3 is a hub 4 which is mounted on and turnable about a shaft 5 defining an upright turning axis for the hub 4.

A plurality of two-part arms (the parts are identified with reference numerals 6 and 7, respectively) radiate in star-shaped configuration from the hub 4. The part 7 of each arm is connected with the part 6 thereof for turning movement about an upright axis 9 and carries a plurality of tines (a set) 8 which project downwardly from the part 7 towards the ground 17 on which the machine is supported. Each of the arms 7 is connected with an excenter cam or disc 12, which is excentric with reference to the shaft 5, via a tensile member 11 connected with the center point 10 of the respective arm 7. When the hub 4 rotates, the arm portions 7 are so caused to turn about their respective axes 9—by virtue of the connection of the respective tensile element 11 with the excenter disc member 12 to which they are connected—that during their movement in the circular path 13 they shift from a position substantially radial with reference to the shaft 5 to a position in which—when they reach the location A (see FIG. 2)—they extend at least substantially tangentially to the path 13. During the movement in the remainder of the path they have picked up, that is engaged, hay or analogous commodities which has been pushed ahead of the tines on the ground, and on reaching the position A the thus engaged commodities are deposited in form of a stack whose position and width is diagrammatically illustrated with reference numeral 14 in FIG. 2. During this deposition process on reaching the location A, the inner end portions of the arms 6 which are engaged by and controlled via the cranks 15 so as to be displaced in a curved track or path 16, are turned upon reaching the location A by the respective set of tines, in such a manner that the tines will be lifted out of the hay of the stack 14 (compare the double-headed arrow in FIG. 3 and the location of the tines 8 with reference to the ground 17). In the thus raised position the tines 8 remain until approximately the point B of FIG. 2, whereupon they are again caused to turn in the opposite direction until they are normal or substantially normal with reference to the ground 17, engaging the same and contacting the respective commodity located thereon for again conveying it until they reach the point A. The direction of rotation of the hub is identified with reference numeral 18.

The device may be supported on height-adjustable travel wheels 19 and may additionally be provided with a guide wheel 20, with all wheels being located within the confines surrounded by circular path 13. The wheels 19 are located on a common axle which is at one side of the axis 5, and the wheel 20 is mounted on an axle paralleling the axle of the wheels 19 but located at the other side. The wheels 20 may be located at that side of the axis 5 which is forwardly in the direction of movement of the machine or, as shown in the drawing, on that side which is rearwardly with reference to the direction of movement of the machine. When the wheels 19 and 20 are provided and located in the illustrated manner, the guide pole 1 is advantageously connected with the machine for pivot movement about a horizontal pivot 21 so that it can be raised and lowered and the machine can accommodate itself to the contour of the ground via its wheels 19, as illustrated in FIG. 1 where the connection of the wheel 20 with the wheels 19 clearly indicates that the latter can move upwardly and downwardly with respect to the wheel 20, and vice versa.

Reference may be had, for those features which have not been illustrated and discussed in detail herein because they are known to the art, to Swiss Pat. No. 392,971 and German Gebrauchsmuster 1,845,630.

It will be understood that each of the elements described above, or two or more together, may also find a useful application in other types of constructions differing from the types described above.

While the invention has been illustrated and described as embodied in an agricultural machine, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an agricultural machine, in combination, support means spaced upwardly from the ground on which said machine is supported; a hub carried by said support means and turnable about an upright axis; a plurality of angularly spaced arms carried by and extending outwardly from said hub for turning in a circular path, said arms having outer free end portions; a plurality of sets each composed of a carrier mounted on said outer free end portion of a respective arm for turning movement about a substantially vertical axis, and a plurality of substantially parallel tines carried on said carrier and projecting downwardly toward the ground; and control means for effecting displacement of each of said carriers about said substantially vertical axis from a raking position to a depositing position in which said carriers extend substantially tangentially to said path, and for effecting at the same time upward displacement of the respective arm about a horizontal axis so that said tines move away from the ground.

2. In an agricultural machine as defined in claim 1, said control means comprising a cam disc surrounding and eccentric to said upright axis, and linkage means linking said cam disc with the respective carriers for imparting to the latter during turning of said hub a swivel movement about the respective vertical axis.

3. In an agricultural machine as defined in claim 1, said arms having inner portions adjacent said hub; and further comprising connecting means connecting said inner portions with said hub for performing movement in a curved path during rotation of said hub.

4. In an agricultural machine as defined in claim 1, said control means comprising a cam disc surrounding said upright axis and operatively connected with said sets of tines for imparting thereto said turning movements about the respective vertical axes.

5. In an agricultural machine as defined in claim 1; and further comprising a three-wheeled chassis for said support, located within said circular path.

6. In an agricultural machine as defined in claim 5, wherein one of the wheels of said chassis is a guide wheel turnable about an axle which parallels the common axle of the remaining wheels.

7. In an agricultural machine as defined in claim 5, said machine further having a guide pole connected with said support for pivotal displacement about an at least substantially horizontal pivot axis.

8. In an agricultural machine as defined in claim 4; said control means further comprising crank means associated with said cam disc and the respective arms for swivelling the latter about their respective longitudinal axes in response to turning of said hub.

* * * * *